Figure 1:
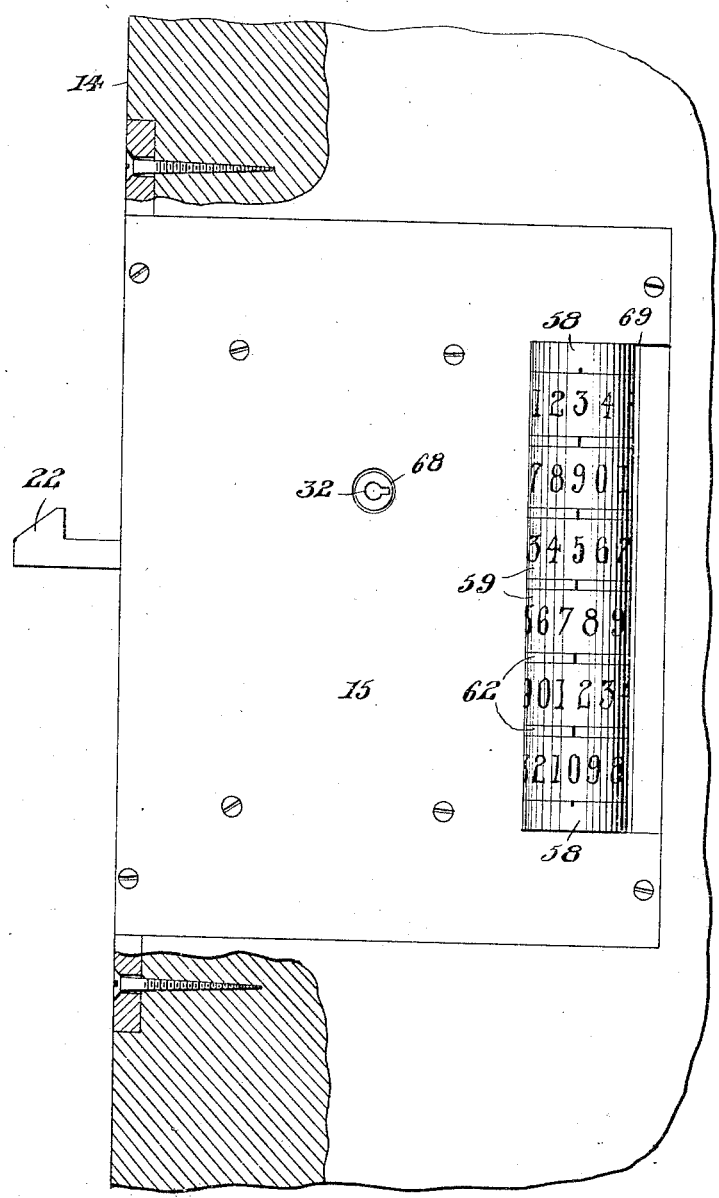

J. BULANDA.
PERMUTATION LOCK.
APPLICATION FILED FEB. 21, 1919.

1,327,140.

Patented Jan. 6, 1920.
6 SHEETS—SHEET 1.

Inventor
J. Bulanda

By A. M. Wilson
Attorney

J. BULANDA.
PERMUTATION LOCK.
APPLICATION FILED FEB. 21, 1919.

1,327,140.

Patented Jan. 6, 1920.
6 SHEETS—SHEET 2.

Inventor
J. Bulanda

By A. M. Wilson
Attorney

J. BULANDA.
PERMUTATION LOCK.
APPLICATION FILED FEB. 21, 1919.

1,327,140.

Patented Jan. 6, 1920.
6 SHEETS—SHEET 3.

Inventor
J. Bulanda

By N. M. Wilson
Attorney

J. BULANDA.
PERMUTATION LOCK.
APPLICATION FILED FEB. 21, 1919.
1,327,140.
Patented Jan. 6, 1920.
6 SHEETS—SHEET 4.
FIG. 5.
FIG. 7.
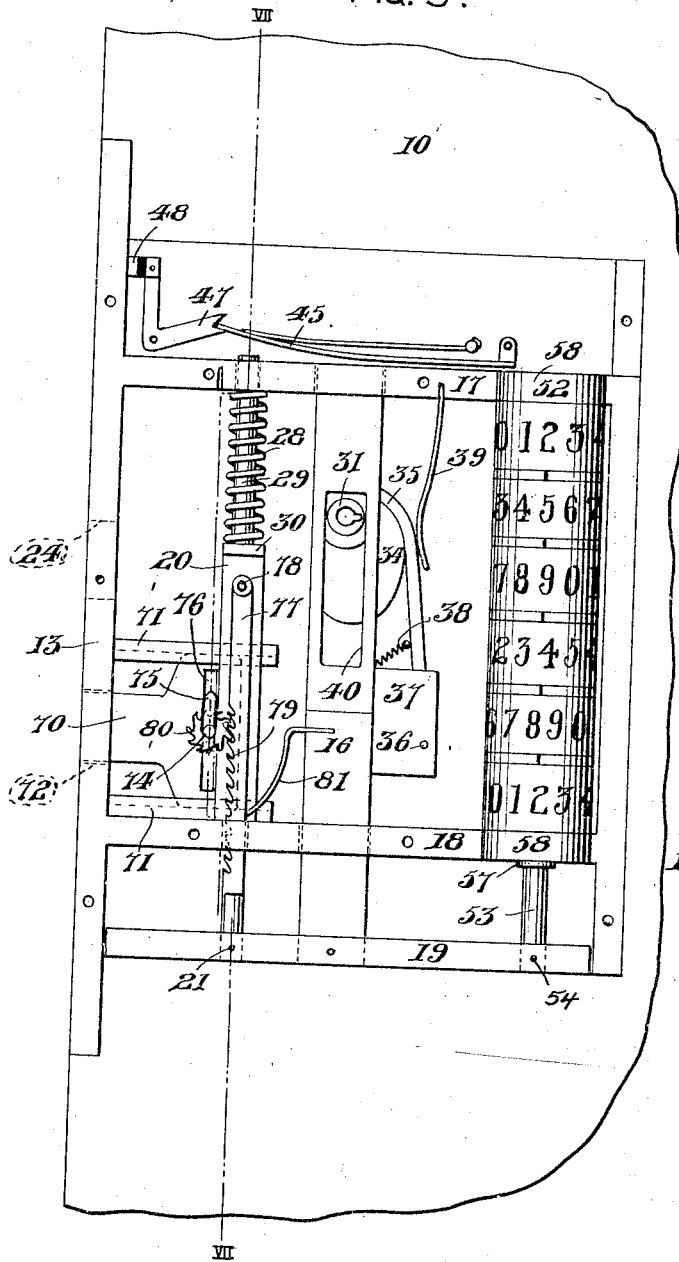
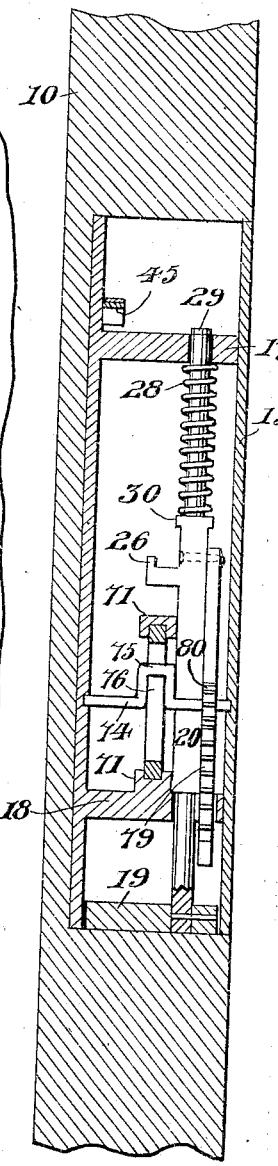
Inventor
J. Bulanda
By
N. M. Wilson
Attorney J. BULANDA.
PERMUTATION LOCK.
APPLICATION FILED FEB. 21, 1919.
1,327,140.
Patented Jan. 6, 1920.
6 SHEETS—SHEET 5.
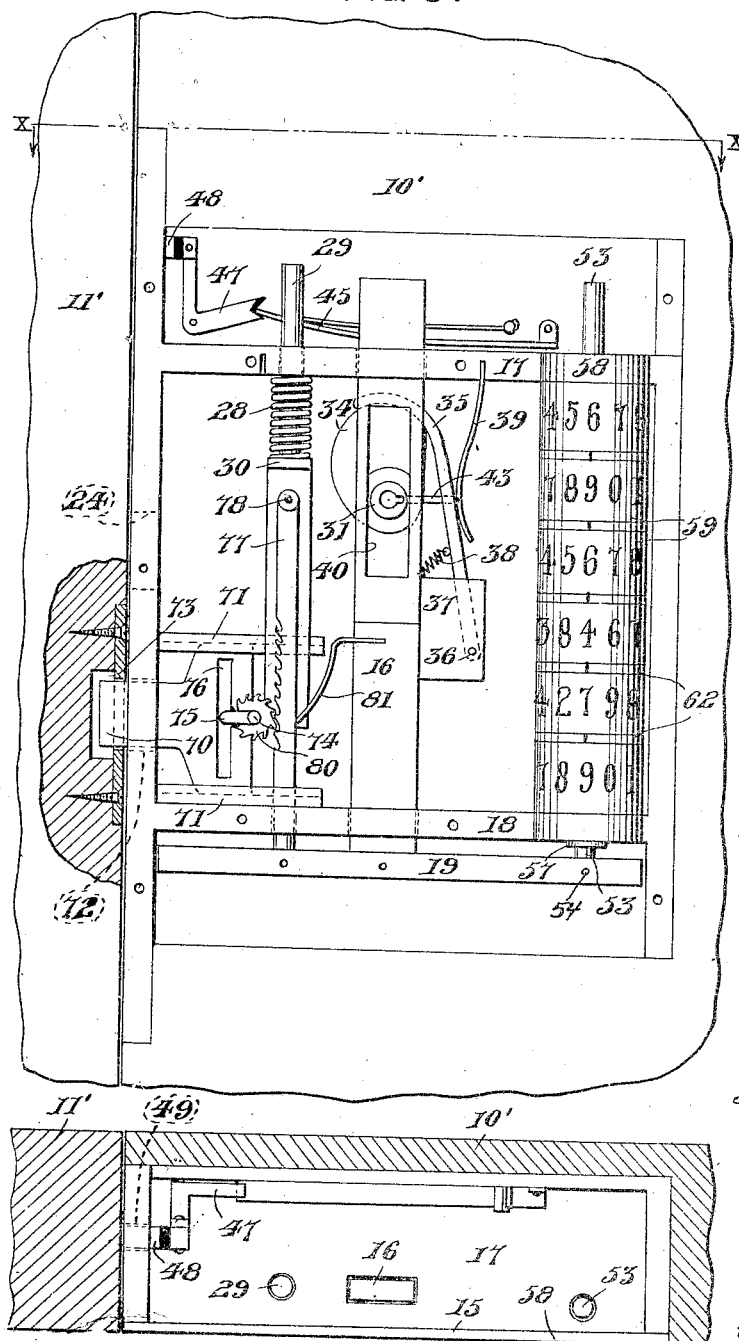
Inventor
J. Bulanda
Attorney J. BULANDA.
PERMUTATION LOCK.
APPLICATION FILED FEB. 21, 1919.
1,327,140.
Patented Jan. 6, 1920.
6 SHEETS—SHEET 6.
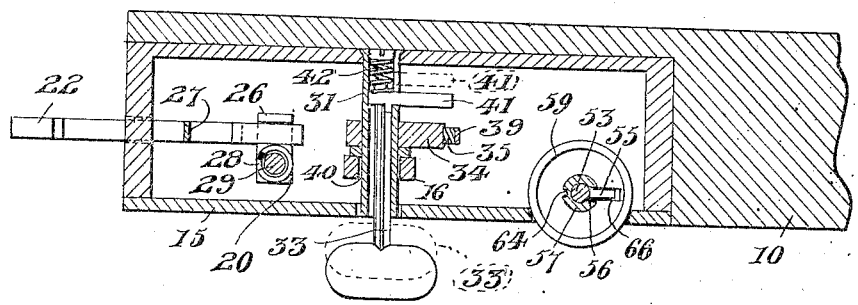
FIG. 11.
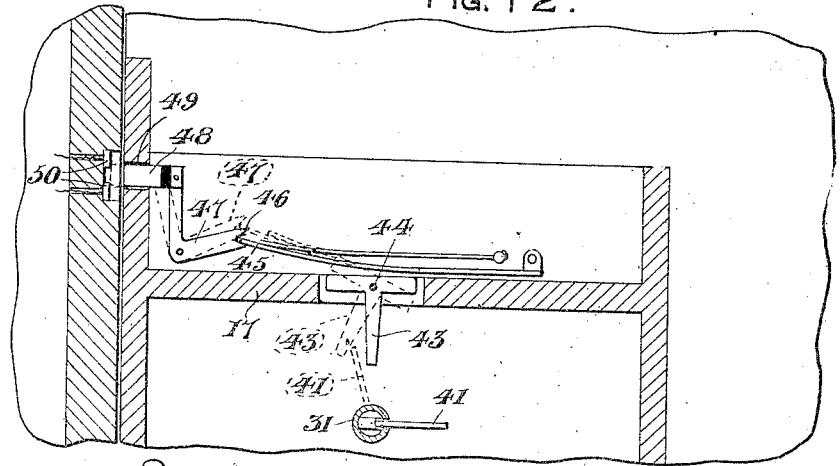
FIG. 12.
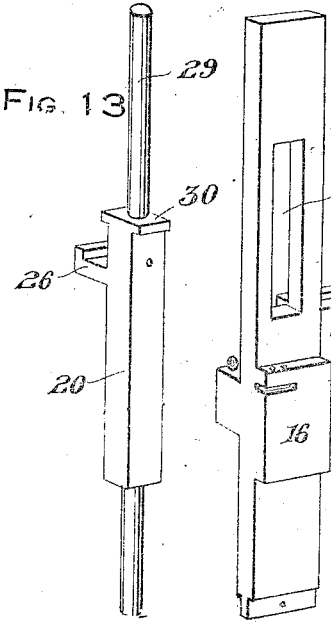
FIG. 13.
FIG. 14.
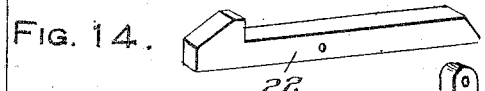
FIG. 16.
FIG. 15.
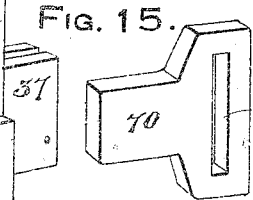
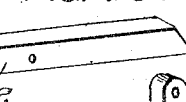
FIG. 17.
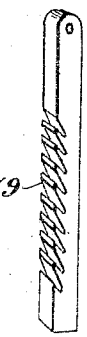
Inventor
J. Bulanda
By N. M. Wilson
Attorney

UNITED STATES PATENT OFFICE.

JOHN BULANDA, OF PULLMAN, ILLINOIS.

PERMUTATION-LOCK.

1,327,140.

Specification of Letters Patent.

Patented Jan. 6, 1920.

Application filed February 21, 1919. Serial No. 278,398.

*To all whom it may concern:*

Be it known that I, JOHN BULANDA, a citizen of Poland, having declared my intention to become a citizen of the United States of America, residing at Pullman, in the county of Cook and State of Illinois, have invented certain new and useful Improvements in Permutation-Locks, of which the following is a specification.

The primary object of the invention is the provision of a permutation lock serviceable both for door, either hinged or sliding, and for receptacles such as trunks.

A still further object of the invention is to provide a permutation lock for swinging doors and lids and in which the lock mechanism is readily actuated by a suitable key only after permutation members have been operated for releasing the same, the permutation members normally holding the mechanism against actuation by the key.

With these general objects in view, the invention consists of the combination and arrangement of parts hereinafter fully described in connection with the accompanying drawings and in which like reference characters designate corresponding parts throughout the several views.

Figure 2:
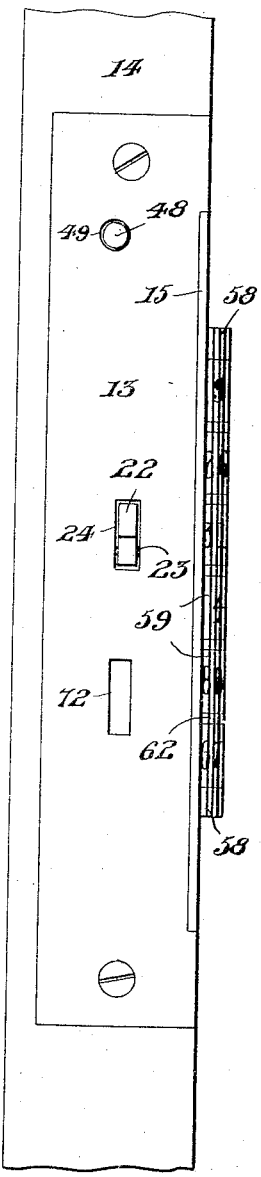
Figure 3:
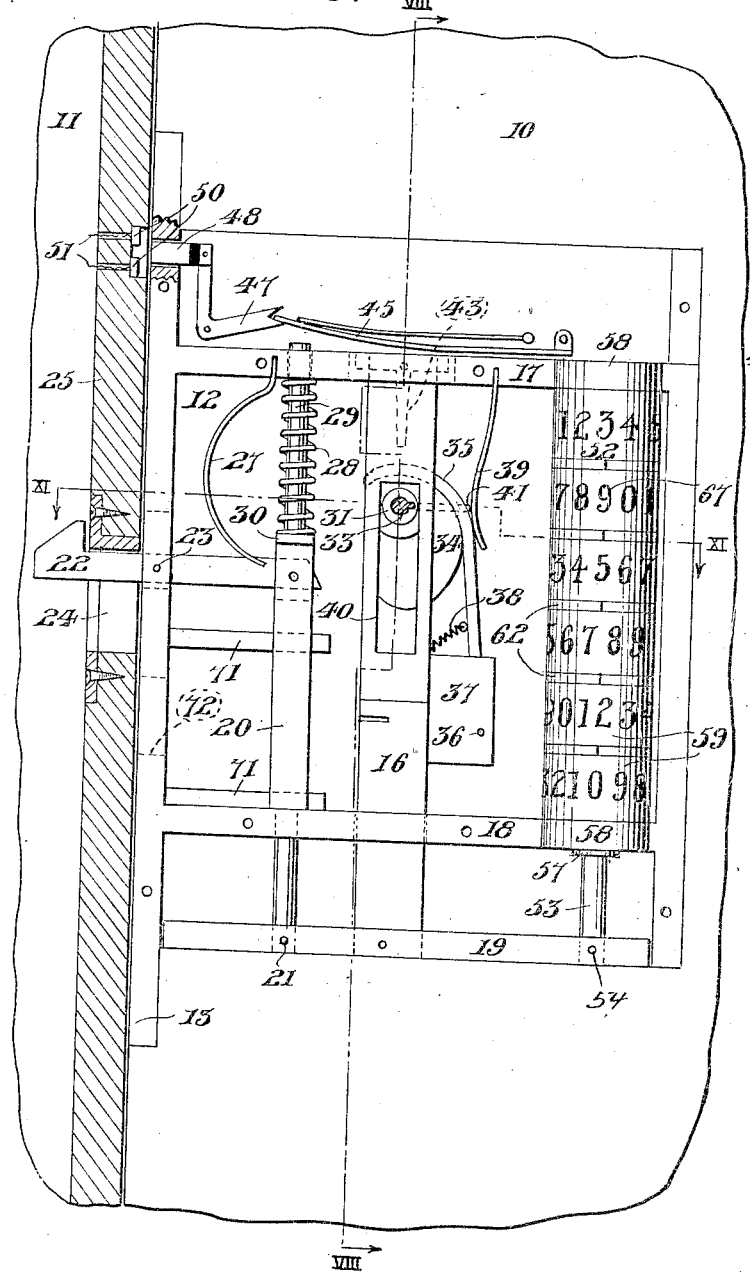
Figure 8:
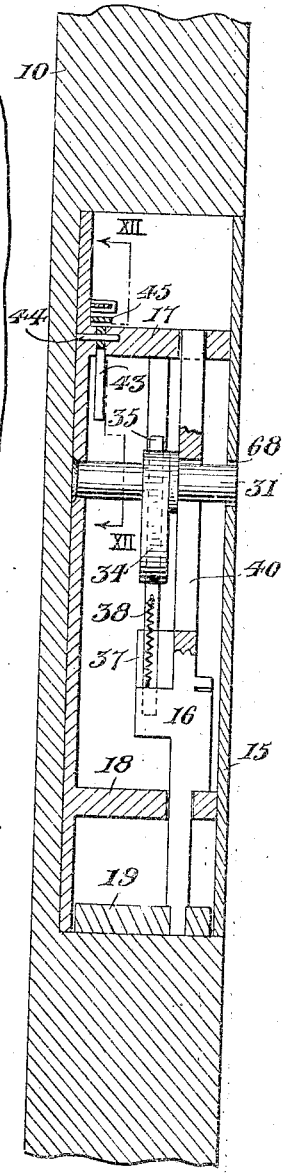
Figure 4:
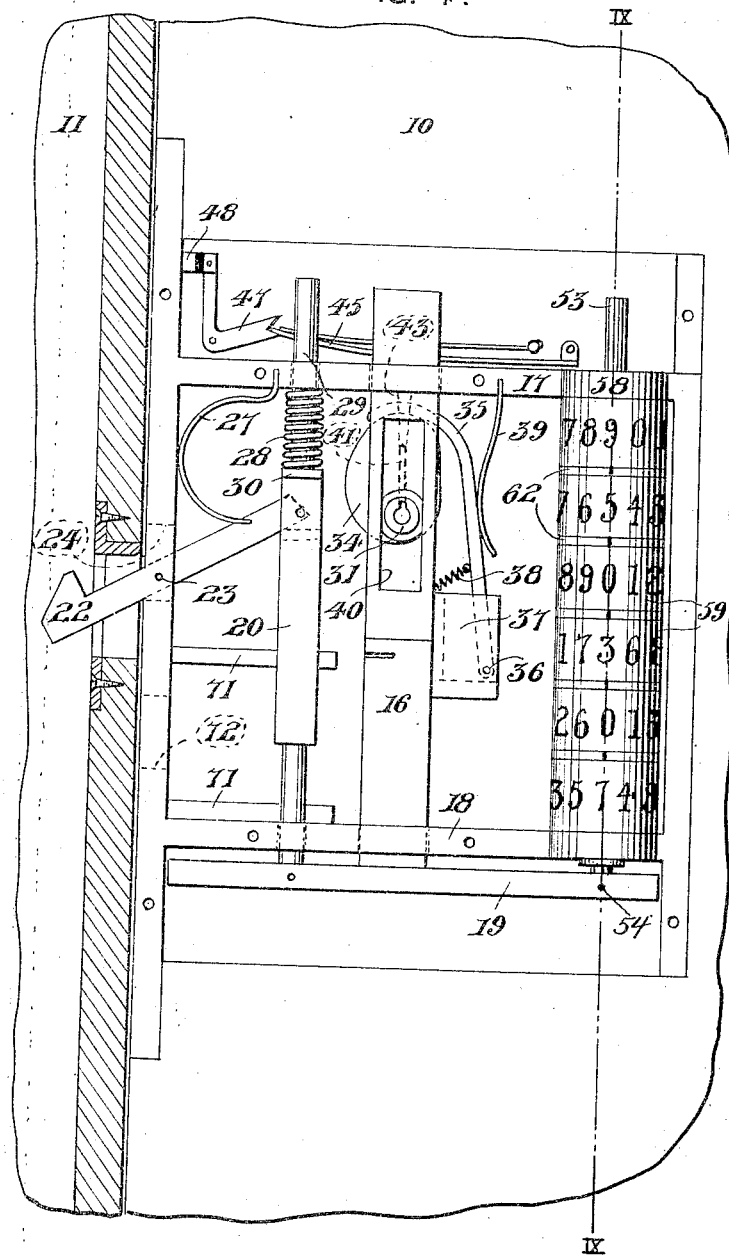
Figure 9:
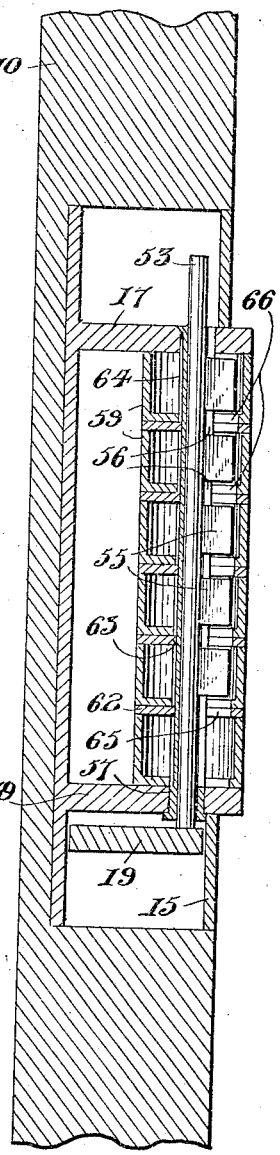

In the drawings,

Figure 1 is an elevational view of a side portion of a trunk or sliding door with my form of permutation lock installed thereon, Fig. 2 is an edge elevation thereof, Fig. 3 is a view similar to Fig. 1 with the front plate of the lock removed, a keeper member being shown engaged by the lock, Fig. 4 is a view similar to Fig. 3 with the lock mechanism released, Fig. 5 shows a form of construction employing a sliding bolt, the bolt being illustrated in its retracted position, Fig. 6 is a view similar to Fig. 5 showing the bolt projected, Fig. 7 is a sectional view taken substantially upon line VII—VII of Fig. 5, Fig. 8 is a sectional view taken upon line VIII—VIII of Fig. 3, Fig. 9 is a sectional view taken upon line IX—IX of Fig. 4, Fig. 10 is a sectional view taken upon line X—X of Fig. 6, showing one end of the casing, Fig. 11 is a transverse sectional view taken upon line XI—XI of Fig. 3, Fig. 12 is a detail sectional view taken upon line XII—XII of Fig. 8, Fig. 13 is a perspective view of the latch actuator, Fig. 14 is a perspective view of a mounting slide for the lock mechanism, Fig. 15 is a perspective view of the sliding bolt, Fig. 16 is a similar view of the swinging latch, Fig. 17 is a perspective view of the operating rack for the sliding bolt and Figs. 18 to 22, both inclusive, are perspective views of different parts of the permutation member employed with the lock.

It being understood that both forms of the invention, that is, the forms employing the swinging latch and sliding bolt, may be used in connection with either doors or receptacles such as trunks and the swinging latch or hook form of construction will be illustrated and described as employed upon a trunk 10 having a lid 11 while the sliding bolt construction will be described in connection with a swinging door 10′ and the door casing 11′.

My invention comprises a rectangular mechanism casing 12 adapted for countersinking in the outer side of the trunk 10 with a bearing plate 13 at the upper edge 14 of the trunk while a cover plate 15 of the casing 12 is upon the outer side of the trunk. A slide 16 is transversely positioned through the opposite sides 17 and 18 of the casing 12 having a cross head 19 upon one end of the slide outwardly of the side 18 of the casing. A latch actuator 20 is also slidably positioned through the casing sides 17 and 18 adjacent the slide 16 with one of its ends secured as at 21 to the head 19.

A swinging latch or hook 22 is pivoted as at 23 through a slot 24 in the bearing plate 13 of the casing 12 adapted for engaging a suitable keeper such as an opening 24 in the adjacent portion or flange 25 of the lid 11.

The inner end of the latch 22 is resiliently maintained upon a seat 26 projecting from the actuator 20 by means of a leaf spring 27 engaging the latch at one end while the other end of the spring is secured to the side 17 of the casing. A helical spring 28 surrounds the cylindrical end portion 29 of the actuator 20 and bears between the casing side 17 and a shoulder 30 upon the actuator 20 slightly spaced from the seat 26. The spring 28 normally maintains the head 19 projected at the limit of its movement away from the casing side 18 with the slide 16 also projected, while the spring 27 normally maintains the latch 22 perpendicular to the actuator 20 and the bearing plate 13 for engaging the keeper as best illustrated in Fig. 3 of the drawings.

The keyhole post 31 is journaled through the casing 12 with an axially arranged slot 32 adapted for the reception of a suitable key 33. The key 33 is adapted to turn the post 31, carrying the cam 34 which is carried by said post against a curved arm 35 pivoted as at 36 to a side projection 37 of the slide 16. A coiled spring 38 connects the said slide with the arm 35 assisting in maintaining the said arm in contact with the periphery of the cam 34 while a leaf spring 39 assists in accomplishing the same object, being secured at one end to the casing side 17 while its opposite end portion engages the arm 35.

A longitudinal slot 40 is provided in the slide 16 through which the post 31 extends. The turning of the cam 34 shifts the slide 16 by means of the arm 35 thereby moving the head 19 toward the casing side 18 and carrying the actuator 20 with the said head for releasing the latch 22 as illustrated in Fig. 4 of the drawings.

A person in possession of the key 33 or a similar key but unfamiliar with the lock structure will place the key in the slot 32 with the key resting upon a foot 41 resiliently seated on a spring 42 at the inner end of said post 31. Upon forcing the key 33 inwardly, the foot 41 and key are moved to positions indicated by dotted lines in Fig. 11 of the drawings, and then the key and foot are revolved, bringing the foot 41 in contact with the rocker 43 pivoted to the casing side 17 as at 44. This movement of the rocker 43 contacts and elevates a spring pressed strip 45 engaging within a notch 46 in the adjacent end of an angular lever 47 and shifting the said lever for forcing a switch arm 48 outwardly through a perforation 49 in the bearing plate 13 as indicated in Fig. 12 of the drawings. Suitable electrical contacts or terminals 50 are carried by the adjacent portion of the lid 11 for engagement by the switch arm 48 for closing the circuit in the conducting wires 51 of a suitable alarm such as a bell, not shown.

When the unauthorized person turns the key in the lock in substantially the usual manner, the alarm to which the wires 51 are connected in circuit will be sounded giving notice to the owner that some one is tampering with the lock. Such movements of the key, however, will not move the slide 16 nor have any influence upon the latch 22 for the reason that the head 19 is prevented from shifting when the device is locked by means of the permutation member 52 hereinafter described and controlling the movements of the slide rod 53 secured to the head 19 as at 54 and slidably mounted through the casing sides 17 and 18 parallel with the slide 16 and actuator 20.

The springs 38 and 39 are of sufficient strength to hold the arm 35 against the cam 34 for actuating the slide 16 when the cam is turned at any time when the permutation device 52 is released. When the permutation device 52 is locked, the turning of the cam 34 forces the arm 35 outwardly and the cam and post 31 may completely revolve, actuating the alarm rocker 43 when the foot 41 is depressed but at all events causing no injury to the lock mechanism by reason of the forced turning of the cam 34 and post 31 when the slide 16 is held against movement by the permutation device 52.

The rod 53 is provided with spaced wards 55 upon one side thereof for sliding longitudinally of a side slot 56 in a tube 57 being rigidly secured between enlargements 58 provided at opposite points upon the sides 17 and 18 of the lock casing 12. The permutation device 52 includes a plurality of permutation tumblers 59 journaled upon the tube 57, each permutation tumbler 59 having a keyhole-shaped slot 60 in the bottom 61 thereof by means of which the member is journaled upon said tube 57. The bottom 61 of each permutation tumbler 59 is normally positioned between the spaced wards 55 of the rod 53 when the permutation device is locked, it being understood that the longitudinal movement of the rod 53 engages the wards 55 with the bottom 61 of the permutation tumblers, thereby preventing the longitudinal movement of said rod 53. A disk 62 is provided upon the tube 57 between the permutation tumblers 59, an inwardly projecting lug 63 of each disk 62 being fitted within a longitudinal groove 64 of the tube 57 preventing the disks from turning and positioning the disks so that the radial slot 65 of each disk is in alinement with the wards 55 permitting the wards to pass therethrough during the longitudinal movement of the rod 53.

By turning the permutation tumblers 59 so that the radial slot portions 66 of the openings 60 of each permutation tumbler is in alinement with the slot 65 of the disks 62, the rod 53 may be freely moved longitudinally. Numbers 67 are provided upon the outer surfaces of the permutation tumblers 59 and when it is desired to move the latch 22 to its releasing position, the predetermined combination is set upon the permutation tumblers 59 to permit the longitudinal movement of the rod 53 and then the key 33 is inserted in the post 31 and turned for forcing the head 19 toward the casing side 18 and shifting the actuator 20 as well as the latch 22 as heretofore fully described. Upon releasing the key 33, the spring 28 normally returns the latch 22, actuator 20 and slide 16 together with the head 19 and rod 53 to their normal position so that the combination may be turned off by revolving the permutation tumblers 59 which will again secure the rod 53 against longitudinal movement. The mechanism is hid from view when the cover plate 15 is in position with the exception of the keypost 31 which is visible through the opening 68 in said plate and a side portion of the permutation device 52 which projects through a cutaway portion 69 in the plate 15 for engagement by the fingers of the operator in shifting the combination.

A sliding bolt 70 may be employed for operation by the actuator 20 instead of or in addition to the latch 22 and the employment of such a bolt is best illustrated in Figs. 5 and 6 of the drawings in connection with the door 10' and door casing 11'. The main elements of the lock mechanism including the entire permutation device are unchanged so that a repetition of the description thereof is unnecessary. This bolt 70 is slidably mounted within the casing 12 between spaced guides 71, the bolt when projected extending outwardly of the bearing plate 13 heretofore noted through a slot 72 provided therein. The bolt 70 is adapted for reception in a keeper 73 mounted in the usual manner upon the door casing 11'.

A crank shaft 74 is journaled within the casing 12 having its wrist portion 75 positioned in a transverse slot 76 of the bolt 70, whereby upon a partial rotation of the shaft 74, the bolt 70 will be projected or retracted according to the direction of rotation of said crank shaft. A rack 77 is pivoted as at 78 to one side of the actuator 20 having its teeth 79 maintained in constant mesh with a pinion 80 secured to the shaft 74 by means of a spring 81. When the permutation device 52 is released and the key 33 turned in the post 31 as heretofore described the slide 16 and actuator 20 will be operatively shifted, carrying the rack 77 therewith and turning the pinion 80 which revolves the shaft 74 and projects the bolt 70 from its position shown in Fig. 5 of the drawings to that indicated in Fig. 6 thereof. It will be evident that the bolt 70 projected in locking engagement with its keeper 73 and with the cross head 19 elevated as shown in Fig. 6, the permutation tumblers 59 may then be turned for maintaining the device locked by securing the rod 53 against return movement. When it is desired to release the bolt 70, the combination may be set upon the permutation device 52 which will permit the spring 28 to simultaneously move the actuator 20, head 19 and rod 16 and carrying the rack 77 with the actuator for turning the pinion 80 and shaft 74 and to automatically retract the bolt 70, it being understood that the bolt then remains retracted until projected to its locking position by means of the key 33 as heretofore described. It will be understood that minor changes may be made in the arrangement of parts of the device if desired such for instance as changing the wrist portion 75 for engaging within the slot 76 of the bolt 70 at the opposite side of the pinion 80 from that herein disclosed and whereby the spring 28 would automatically project the bolt instead of retracting the same as herein set forth.

A serviceable permutation lock is provided in which either a swinging latch or sliding bolt or both may be employed while an alarm to indicate unauthorized tampering with the lock structure is preferably included. In either form of the invention, the permutation tumblers 59, it will be noted, may be turned for locking the rod 53 at either extremity of its longitudinal movement or in other words with the locking member of the mechanism retained either in its locked or released position.

What I claim as new is:—

1. A lock comprising a casing, a cross head shiftable in the casing, a key manipulated slide carried by the cross head, a latch within the casing and a spring pressed latch actuator operatively connected to the head.

2. A lock comprising a casing, a cross head shiftable in the casing, a key manipulated slide carried by the cross head, a spring pressed actuator attached to said head and a pivoted latch operatively connected to said actuator.

3. A lock comprising a casing, a cross head shiftable in the casing, a key manipulated slide carried by the cross head, a latch within the casing, a spring pressed latch actuator operatively connected to the head, a slide rod in the casing attached to said head and permutation controlling means upon said rod and projecting outwardly of the front side of the casing.

4. A lock comprising a casing, a cross head shiftable in the casing, a key manipulated slide carried by the cross head, a spring pressed actuator shifted by said head, a pivoted latch operatively connected to said actuator, a slide rod in the casing attached to said head and permutation controlling means upon said rod and projecting outwardly of the front side of the casing.

5. A lock comprising a casing, an actuator slidable in the casing, a locking member operatively connected with the actuator having a portion thereof adapted for engaging a keeper exteriorly of the casing, a normal positioning spring for the actuator, a slide in the casing parallel with the actuator, a cross head operatively connecting the actuator and slide together and key operating means for the slide.

6. A lock comprising a casing, an actuator slidable in the casing, a locking member operatively connected with the actuator having a portion thereof adapted for engaging a keeper exteriorly of the casing, a normal positioning spring for the actuator, a slide in the casing parallel with the actuator, a cross head operatively connecting the actuator and slide together, the said slide provided with a slot, a key post journaled in the casing extending through said slot, a cam upon said post, a curved arm pivotally connected to the slide and resiliently maintained in constant contact with the periphery of said cam whereby the rotation of said cam and post in one direction is adapted for simultaneously moving said slide, head and actuator.

7. A lock comprising a casing, an actuator slidable in the casing, a locking member operatively connected with the actuator having a portion thereof adapted for engaging a keeper exteriorly of the casing, a normal positioning spring for the actuator, a slide in the casing parallel with the actuator, a cross head operatively connecting the actuator and slide together, key operating means for the slide, a rod slidably positioned in the casing attached to said head, spaced wards upon said rod, permutation members journaled concentrically of the rod adapted for permitting the passing of said wards therethrough when the permutation members are positioned in predetermined relations, to normally prevent the longitudinal movement of the rod when in any other relative positions.

8. A lock comprising a casing, an actuator slidable in the casing, a locking member operatively connected with the actuator having a portion thereof adapted for engaging a keeper exteriorly of the casing, a normal positioning spring for the actuator, a slide in the casing parallel with the actuator, a cross head operatively connecting the actuator and slide together, the said slide provided with a slot, a key post journaled in the casing extending through said slot, a cam upon said post, a curved arm pivotally connected to the slide and resiliently maintained in constant contact with the periphery of said cam whereby the rotation of said cam and post in one direction is adapted for simultaneously moving said slide, head and actuator, a rod slidably positioned in the casing attached to said head, spaced wards upon said rod, permutation members journaled concentrically of the rod adapted for permitting the passing of said wards therethrough when the permutation members are positioned in predetermined relations, to normally prevent the longitudinal movement of the rod when in any other relative positions.

In testimony whereof I affix my signature.

JOHN BULANDA.